Nov. 1, 1966 F. S. VIGLIANTE 3,283,082

TELEPHONE SWITCHING SYSTEM INCORPORATING SELECTIVELY CONTROLLED RINGBACK

Filed May 24, 1963 2 Sheets-Sheet 1

INVENTOR
F. S. VIGLIANTE
BY
R. C. Winter
ATTORNEY

United States Patent Office 3,283,082

Patented Nov. 1, 1966

3,283,082

TELEPHONE SWITCHING SYSTEM INCORPORATING SELECTIVELY CONTROLLED RINGBACK

Frank S. Vigliante, Piscataway Township, Middlesex County, N.J., assignor to Bell Telephone Laboratories, Incorporated, New York, N.Y., a corporation of New York Filed May 24, 1963, Ser. No. 282,956
13 Claims. (Cl. 179—27)

Figure 1:
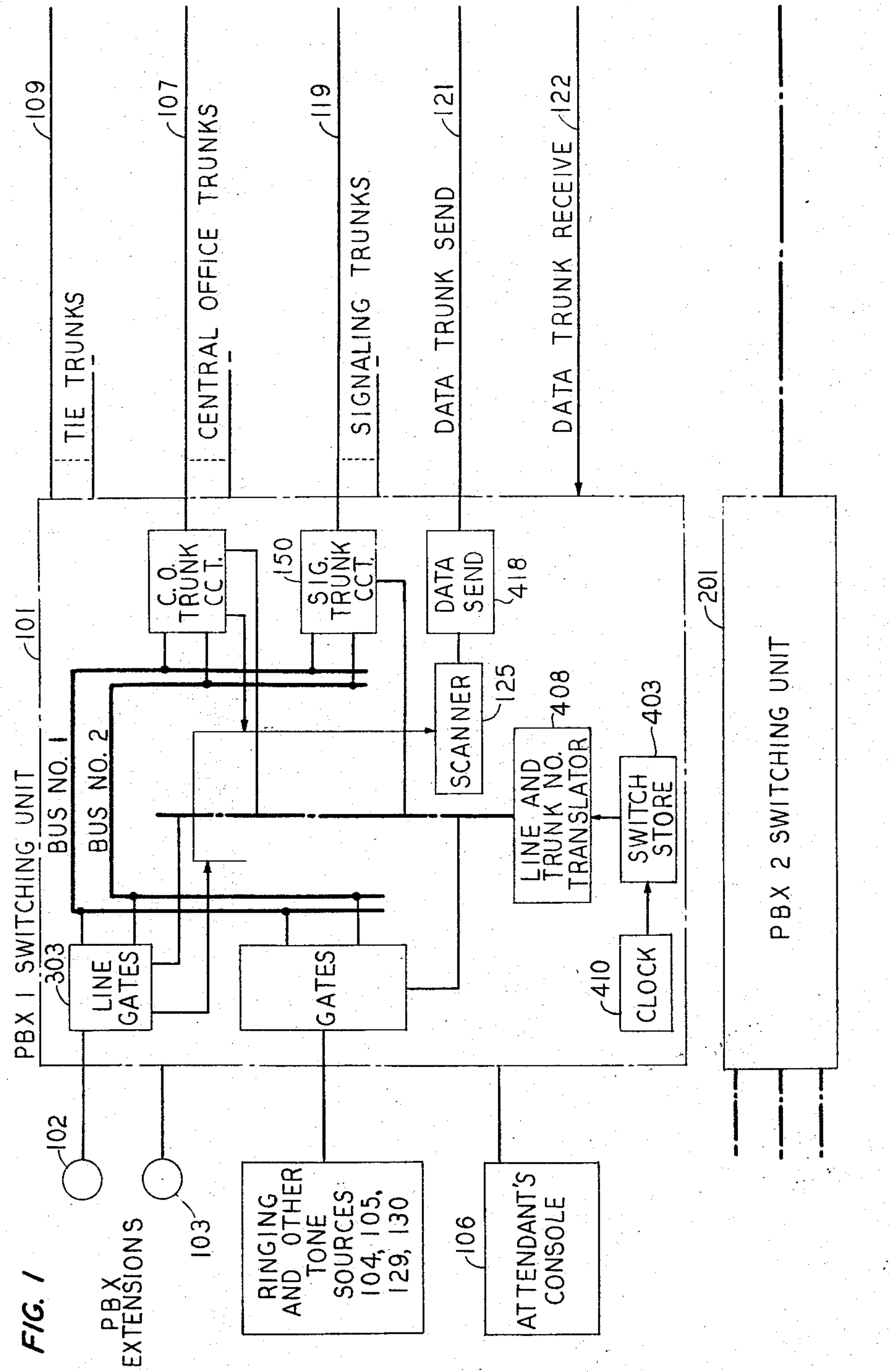

This invention relates to telephone switching systems, and more particularly, to ringback arrangements for electronic time division systems.

The copending applications of Gebhardt et al., Serial No. 195,199, filed May 16, 1962, now Patent No. 3,225,144, and Vigliante et al., Serial No. 252,797, filed January 21, 1963, disclose improved electronic time division switching systems providing private branch exchange (PBX) service. In these systems a single control unit governs the operations of a plurality of individual switching units, each of the latter serving a relatively small number of extensions.

In these systems, each switching unit is connected to the control unit by signaling trunks and data trunks. The data trunks are utilized for transmitting control and supervisory information between each switching unit and the control unit. The signaling trunks are utilized for transmitting signaling information, e.g., a called number, from each switching unit to the control unit. Each switching unit is also connected to the telephone central office by a plurality of central office trunks. Interconnections in the switching units of the various extension lines, signaling trunks, and central office trunks are accomplished on a time division basis.

The present invention is disclosed in the context of the above-mentioned Gebhardt et al. system and relates to the detection of a ringback signal and the subsequent system operation. Under certain circumstances a central office operator applies a ringback signal to the central office trunk at the termination of a call. Under night service conditions or during off-duty hours, when a PBX calling extension has gone on-hook after certain types of calls, the PBX must be able to recognize ringback by the central office operator. An illustrative situation is that where a night watchman calls the central office operator to report a fire, fails to provide all of the required information and hangs up without identifying his extension. The operator, in other telephone system arrangements, controls the connection and would then ring back to get this information. In systems such as that disclosed in the Gebhardt et al. application, however, the operator does not control the connection and is unable to ring back in any event because ringing current from the central office has no effect on the system, each switching unit containing its own ringing supply. The present invention provides means for enabling detection of the central office ringback, and in response thereto for causing ringing to be supplied to the now on-hook extension and for connecting this extension to the previously used central office trunk.

It is an object of this invention to enable a telephone system of this type to detect ringback and similar signals from the central office.

It is another object of this invention to enable the telephone system to operate responsive to the detection of ringback signals, e.g., for re-establishing PBX extension and central office interconnections.

In the Gebhardt et al. system signaling information on the signaling trunks connecting each switching unit to the control unit is in the form of multifrequency tones. Each of the decimal digits is represented by a pair of tones. Thus, for example, to transmit the digit 0 from one of the switching units to the control unit, a pair of tones peculiar to the digit 0 is transmitted over one of the respective signaling trunks. The ringing signal, e.g., 20 cycles, normally applied by the central office to a central office trunk has no effect on the system. Each switching unit contains its own ringing supply, the ringing source being connected to each extension through the respective time division switching network under the influence of the control unit. In order that the ringing signal applied by the central office be compatible with the Gebhardt et al. system, in accordance with an aspect of my invention the ringing current from the central office is converted in the trunk circuit of each central office trunk to a pair of tones representing a particular digit and, in one illustrative embodiment, the digit 0.

Although the ringback signal is thus converted to a signal intelligible to the PBX system, it must be extended to the control unit in order that the latter may detect it. When the switching unit notifies the control unit that the calling exension has gone on-hook, the control unit causes the switching unit to interconnect the previously used central office trunk with one of the signaling trunks extended between the switching unit and the control unit rather than with the extension line. The digit 0 appearing on the central office trunk is thus extended via a signaling trunk to the control unit. The control unit scans for the appearance of the digit 0 for a predetermined time interval after the calling extension has gone on-hook. If the ring-back signal is not detected the control unit causes the call to be terminated, i.e., all switching connections are released and the call information is erased from the control unit memory. If, on the other hand, the ringback signal is detected, the control unit notifies the switching unit over a data trunk to apply ringing to the extension involved in the call, and to connect this extension to the central office trunk in the same time slot originally serving the call. When the extension goes off-hook in response to the ringing (applied by the switching unit) the extension is connected by the time division switching network to the central office operator.

It is a feature of this invention to provide means in each central office trunk circuit to convert a ringback signal on the respective central office trunk to a pair of tones representing, in this embodiment, the digit 0.

It is another feature of this invention to enable the control unit, under certain conditions and in response to an originating extension going on-hook, to cause a switching unit to connect the central office trunk previously connected to the extension to a signaling trunk in the same time slot previously serving the extension.

It is another feature of this invention to provide means for enabling the control unit to scan for the appearance of the pair of tones representing the digit 0 on the signaling trunk, and to maintain the central office trunk-signaling trunk connection for a predetermined time interval after the calling extension goes on-hook.

It is still another feature of this invention to enable the control unit, in response to the detection of the digit 0 on a signaling trunk during the predetermined time interval, to instruct the respective switching unit to ring the now on-hook extension and to interconnect the extension and the previously used central office trunk in the previously used time slot.

Figure 2:
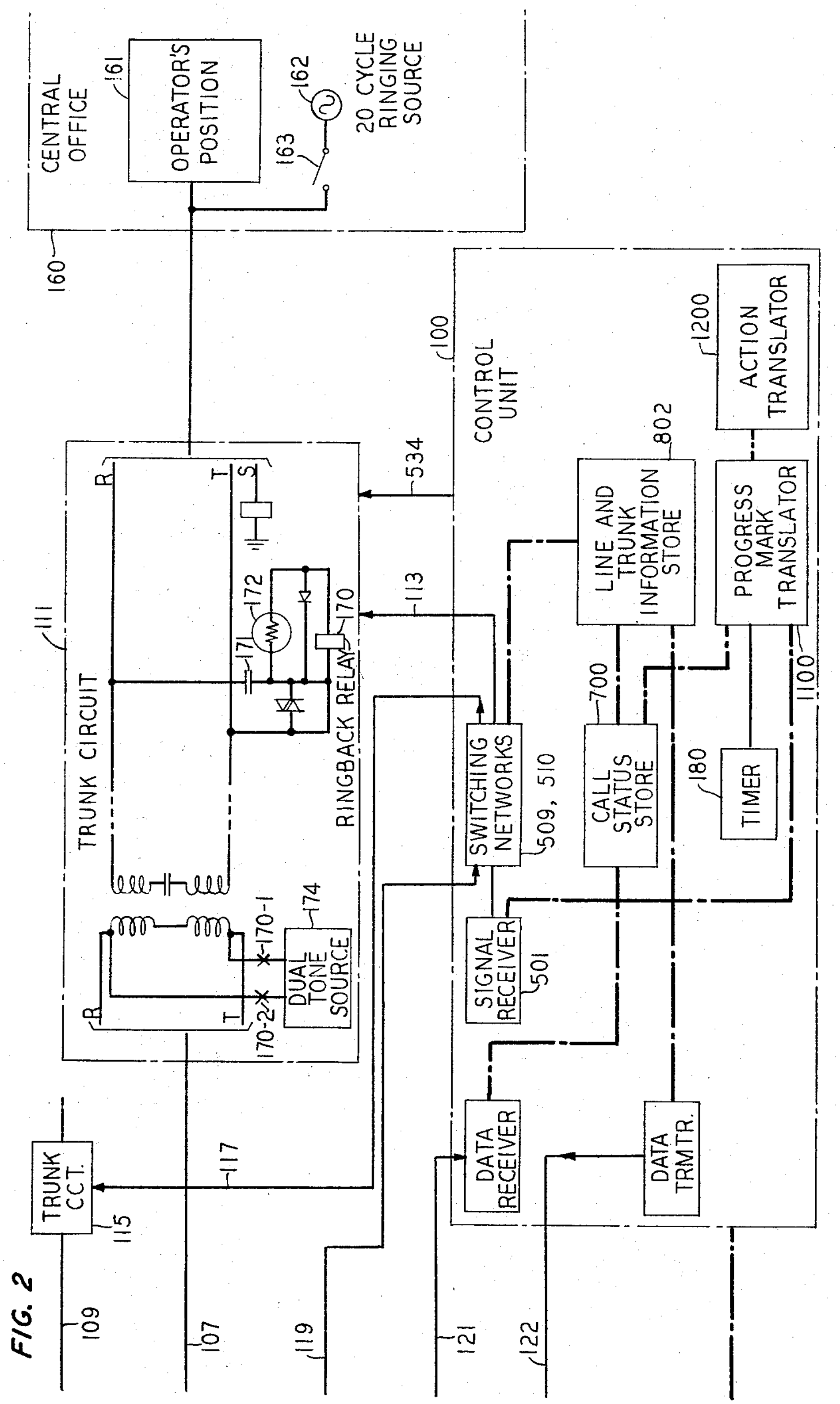

Further objects, features and advantages of the invention will become apparent upon consideration of the following detailed description in conjunction with the drawing, FIGS. 1 and 2 together are a schematic representation of one specific illustrative embodiment of my invention as incorporated into the time division telephone switching system of the above-mentioned Gebhardt et al. application.

In order to simplify an understanding of the operation of my present invention, the detailed circuitry of the Gebhardt et al. application has not been repeated herein, only those specific components of the prior application particularly involved in the present invention being depicted herein. Accordingly it is to be understood that the entire Gebhardt et al. disclosure is herein incorporated by reference. It is appreciated that a few minor changes in the Gebhardt et al. system are necessary to control the particular sequence contemplated by my present invention, e.g., the various translators must be modified; however, these changes will become apparent to those skilled in the art upon consideration of the following detailed description. Further, to facilitate the understanding of my invention in the context of the Gebhardt et al. system, the various structural elements disclosed herein and in the prior application are referred to by the same designating reference numeral.

It should also be noted that certain elements, of which in a telephone system there would be more than one, such as central office trunks, signaling trunks, signal or data receivers, etc., are represented in the drawing by but a single example of the circuit, it being understood that this individual element is representative of the plurality which may be actually required, as is known in the art.

Turning now to the drawing, there is shown a control unit 100 which serves PBX switching units such as 101 and 201. The switching unit 101 includes a variety of control and memory circuits in addition to the switching links and gates. This switching unit serves a plurality of extensions of which only extension 102 is shown connected to the switching unit. The normal telephone system tones such as busy tone, recorder tone, ringing tone, etc., are generated at the switching unit by sources such as 104, 105, 129, and 130. These tones are selectively connected to the PBX extensions such as 102 on a time division basis through respective gates connected to the pair of time division buses. The attendant's console 106 provides operator service for the extensions served by the switching unit.

The switching unit 101 is connected to the telephone central office by central office trunks, such as 107. Tie trunks, such 109, connect switching unit 101 to other switching units in the same PBX system. The central office and tie trunks are connected to control unit 100 by way of control conductor groups, such as 113 and 117, the latter being connected to respective trunk circuits, such as 111 and 115. The connections over these control conductor groups provide means for transmitting supervisory and call signaling information forward to the central office 160 or to other switching unit locations.

Two types of transmission facilities interconnect switching unit 101 and control unit 100. Signaling trunks, such as 119, provide transmission paths from calling extensions to signal receivers 501 in the control unit. These signal receivers 501 register call signaling information, the call signaling information having the form of multifrequency tone signals which originate at the extensions of the switching unit. The tone signals are transmitted from the extensions through the time division switching network buses and via the signaling trunk circuits 150 and signaling trunk circuits 119 to the control unit signal receivers 501.

The second type of transmission facility interconnecting each switching unit and the control unit 100 comprises the data send and data receive trunks such as 121 and 122. Each data send trunk 121 is a unidirectional trunk which connects a switching unit to the control unit for the purpose of transmitting data relating to changes in supervisory states, as detected by the scanner 125. Each data receive trunk 122 is a unidirectional trunk for transmitting control signals, i.e., concerning the establishment and disestablishment of connections and signals within the switching unit, from the control unit to the switching unit.

The control unit 100 serves each switching unit such as 101 in accordance with external stimuli received over the data trunk 121 and the signaling trunks 119. The control unit maintains a record of all calls served by the switching unit, and on a serial basis examines this information and alters it in accordance with the external stimuli. In addition, the control unit maintains a record of the supervisory states of lines and trunks, the availability of various elements in the control unit such as signal receivers, and the availability of the various time slots of each of the switching units. The record relating to each call served by control unit 100 is maintained in a call status store 700. The call status store 700 is a word-organized, random access, temporary memory wherein a 45-bit word per time slot is maintained. The information contained in each word includes, for example, a progress mark, and the two extensions, or extension and trunk involved in the particular call.

The call status store 700 is interrogated, and information is inserted in the store to up-date the word pertaining to each call. In each cycle, before proceeding to an ordered sequential service of the time slots of a switching unit, the data receivers 501 (connected to data trunks 121) are interrogated. If a complete message, relating to a line, trunk, or attendant's console 106 of the switching unit presently being served by the control unit has been received, the control unit acts upon this message before proceeding to the sequential service of the time slots within the switching unit. The data message may relate to a call origination or to a call presently served by the control unit. In either event, the control unit will interpret the message and take action in accordance with this interpretation. For example, if the data message relates to a request to originate a call, the control unit will assign a time slot to the request, and before proceeding to the service of the remaining time slots of the switching unit, the control unit will assign a signal receiver and a signaling trunk so that the subscriber requesting service may proceed with the call. The information relating to the request, i.e., the extension of trunk number requesting service and the elements assigned to the request, is recorded in the call status store 700 at the information location associated with the assigned time slot. Similarly, if a data message relates to a call currently served, the control unit will address the call status store at the location of the time slot in which the call is served to permit up-dating of the call status word, e.g., implementing the progress mark, in accordance with the data message. Subsequent to interrogation of the data receivers and concomitant action, the control unit sequentially serves the time slots of the switching unit. A time slot may thus be served twice during one cycle of the control unit; it may be served a first time to accommodate a data message from a distant switching unit and a second time during the sequential service of the time slots.

The call status word, including a progress mark indicates the status of the call. From the time a request for service originates until the time the last connection is released a call passes through many intermediate steps, and associated with each step is a discrete progress mark. For example, a call origination is detected when an extension goes from on-hook to off-hook, and at that time a progress mark is written into the call status store which indicates a request for service. At the same time the number representative of the calling extension is written into one location of the call status word. Subsequently, a signaling trunk and a signal receiver are assigned to the call origination, and their numbers are similarly written into the appropriate spaces in the call status store. When the signaling trunk and the signal receiver are assigned to a call, the progress mark will be up-dated first to indicate the attachment of a signaling trunk, and subsequently to indicate the attachment of a signal receiver to the signaling trunk. As further action takes place the call progress mark is continuously up-dated. All actions within the control unit 100 are dictated by the progress mark relating to a particular call, other internal information such as line class information, etc., and external stimuli in the form of supervisory information and call signaling information.

Call signaling information from an extension at a remote switching unit is received by a signal receiver 501, connected to a signaling trunk 119. The digits of the received call signaling information indicate the destination of the call in progress, and the control unit operates accordingly. Interconnections of signaling trunks 119, signal receivers 501, and trunk circuits 111 are accomplished by way of switching networks 509 and 510. The control unit causes switching network 509 to selectively connect signaling trunks from the switching units to the signal receivers, while the control unit causes switching network 510 to selectively connect signal receivers to the trunk circuits such as 111 and 115; for purposes of simplifying the drawing, the different connections of the switching networks depicted in the Gebhardt et al. disclosure have not been shown here. Thus, call signaling information from the switching units is received by and registered in the signal receivers 501, and supervisory and call signaling information is transmitted from the signal receivers to the trunk circuits by way of the switching network 510. Typical of the signals transmitted in this manner is the call signaling information transmitted to a trunk circuit, and from the trunk circuit to the central office or to another switching unit, in the event the call is to a subscriber not served by switching unit 101.

The problem presented by system ringback requirements becomes apparent upon consideration of the block diagram of the remote switching unit 101. When an extension 102 is connected to central office 160, the talking path connection includes the extension line, a path through the time division switching network, and a central office trunk. Although the control unit controls the call progress, there is no voice communication path from the switching unit to the control unit, or from the central office trunk circuit to the control unit. The only connections are those provided for supervisory, control, and call signaling purposes. The ringback signal from the central office 160 is not one of the supervisory signals detected by the switching or control units. Nor is the ringback signal effective to ring the extension as ringing is under the control of the control and switching units, central office ringing current having no effect upon the system.

In accordance with the novel method and apparatus of my invention, the ringback signal applied by an operator in the central office 160 is detected and utilized to cause a ringback signal to be applied to the extension which has gone back on-hook. The first step, in accordance with one aspect of my invention, is the conversion of the ringback signal in the central office trunk circuit 111 to a pair of tones representative of a specific digit in this system and, in this embodiment, representative of the digit 0. The ringback signal from the central office is thus converted to a form compatible with the Gebhardt et al. system. The second step, in accordance with another aspect of my invention, extends the digit 0 to a part of the system which is able to recognize the digit and act accordingly following its detection; this second step enables the digit 0 thus generated to be extended to the control unit.

Referring again to the drawing, the central office operator at the operator's position 161 applies the ringback signal, as from a 20 cycle ringing source 162, to the central office trunk, the application being shown schematically by the manual switch 163. The 20 cycle ringback signal is applied across the tip and ring conductors of the trunk and thus in series with a ringback relay 170 in the trunk circuit 111. Ringback relay 170 is connected in series with a capacitor 171 and a thermistor 172 to operate on the A.-C. signal from source 162, as is known in the art.

In the drawing only those aspects of the trunk circuit 111 involved in the operation of my invention are depicted, other aspects directed to the operation of the trunk circuit as for direct-current supervision of the trunk, being omitted for clarity and being well known in the art.

Operation of the ringback relay 170 causes closure of its contacts 170–1 and 170–2 connecting a dual tone source 174 across the tip and ring conductors of the central office trunk 107. The tone generator 174 may be of any type known in the art that will generate a pair of distinct frequency tones; in one specific illustrative embodiment the digit 0 was represented by the pair of tones of 941 and 1336 cycles per second. Consequently, in accordance with my invention, application of the normal ringback signal from source 162 in the central office by the operator results in the application of a digit 0 from trunk circuit 111 to the central office trunk 107.

In the course of scanning extensions, the scanner 125 in the switching unit 101 detects a transition from off-hook to on-hook, and causes the data send circuit 418 to transmit a data message over data trunk 121 to the control unit 100 indicating the identity of the changed line and its present state, i.e., on-hook. The control unit interprets the present condition of the extension in light of the prior progress mark associated with that extension, and determines that this is a possible ringback situation. Ringback is possible only if certain conditions are fulfilled. For example, it is necessary that the call had been originated in the switching unit and that the switching unit extension had gone on-hook prior to the release of the central office connection. The control unit, by examining the call status word in store 700 and the external stimuli received, is made aware that a possible ringback situation exists. In such a situation the control unit assigns a signaling trunk 119 to the call, assigns a signal receiver 501 to the call, up-dates the call status word to reflect the assignment of these elements, and transmits a data message over data trunk 122 to the switching unit. This data message notifies the switching unit to release the connection between the incoming trunk 107 and the calling extension 102, and to establish in place thereof and in the same time slot a connection between the incoming trunk 107 and the assigned signaling trunk 119. The switching unit connection is, of course, on a time division basis, as are all connections through the switching unit.

During the sequential servicing of the words in the call status store 700, the call status word representing the possible ringback situation is served in each cycle. Progress mark translator 1100 examines the progress mark of this word and determines that the signal receiver assigned to the call must be inspected for the appearance of the digit 0, i.e., the assigned signal receiver must be scanned to detect the appearance of the ringback signal. If ringback is required the central office operator must ring back within a predetermined time period after the extension goes on-hook. The progress mark translator 1100 controls the scanning of the signal receiver only during this time period by means of a timer 180 connected to the progress mark translator. The timer 180 enables the progress mark translator to control the scanning of the signal receiver only for this predetermined time period. The signal receiver is scanned in the same time slot initially assigned to the call. If the control unit determines that the central office operator did not ring back, a data message is generated and transmitted to the switching unit. This data message controls the release of the call in the normal manner.

If, however, the digit 0 is received by the signal receiver during the ringback period, the control unit is made aware of the central office ringback. The control unit causes the progress mark to be up-dated to indicate the ring-back, clears the call status store 700 of the identities of the connected signal receiver 501 and signaling trunk 119, and transmits a data message to the switching unit over data trunk 122. This message notifies the switching unit to release the connection between the central office trunk 107 and the assigned signaling trunk 119, and to re-establish the connection between the central office trunk 107 and the originating extension 102 in the same previously used time slot. The message also notifies the switching unit to apply ringing tone from source 129 and 130 to the extension line in order that the subscriber be notified of the ringback. When the calling extension goes off-hook once again, the switching unit generates a data message and transmits it over data trunk 121 to the control unit, notifying the latter that the extension is now in contact with the central office operator. The call status word progress mark is up-dated, and from this point the call is supervised in the normal manner until the final termination of the call.

The invention is not limited to the situation in which ringback is supplied by the central office on particular calls. Other types of information transmitted over the central office trunks from the central office may be extended to the control unit in a similar manner. For example, on toll calls where the switching unit subscriber has originated a call which cannot be completed immediately, the toll operator may permit the subscriber to hang up, and she may ring back if the call can be completed within a relatively short time. To notify the subscriber of the ringback, a switching sequence similar to that described above may be provided to notify the control unit of the ringback. The control unit would evaluate the ringback signal in accordance with the progress mark indicating the state of the toll call. Nor is the invention limited to ringing signals supplied by the central office. Other signals may be converted to digits identifiable by the telephone system by utilizing appropriate converting mechanisms. Nor is the invention limited to signals arising in the central office. Circuitry may be provided to enable similar signals to be extended from one switching unit, through a tie trunk and another switching unit, to the control. Thus, it is to be understood that the above-described arrangement is illustrative only of the application of the principles of the invention. Numerous other arrangements may be devised by those skilled in the art without departing from the spirit and scope of the invention.

What is claimed is:

1. A telephone switching system comprising a telephone central office, a plurality of remote switching units, a control unit common to said switching units, data trunks for connecting said control unit to each of said switching units, a plurality of extensions terminating at each of said switching units, a plurality of central office trunks terminating at each of said switching units and selectively connectable through said switching units to said extensions, and signaling trunks interconnecting each of said switching units and said control unit for trasmitting signaling information from said switching units to said control unit, means for detecting a predetermined supervisory condition exhibited by calls extended between said extensions and said central office, means in said central office trunks for converting ringing signals from said central office to signaling information recognizable by said control unit, means in said control unit for generating and transmitting control data over said data trunks to control said switching units to connect the central office trunks serving calls exhibiting said predetermined supervisory condition to said signaling trunks, and means in said control unit for detecting the appearance of said converted recognizable signaling information on said signaling trunks.

2. A telephone switching system in accordance with claim 1 wherein said switching units operate on a time division multiplexing basis.

3. A telephone switching system in accordance with claim 1 wherein said predetermined supervisory condition arises from said extensions connected to said central office trunks going on-hook, and further including means in said control unit responsive to said detecting means for generating and transmitting control data over said data trunks to control said switching units to reconnect said on-hook extensions to said central office trunks.

4. A telephone switching system comprising a control unit and a plurality of remote switching units, signaling transmittal means extended between said remote units and said control unit for transmitting signaling information from said remote units to said control unit, a plurality of extensions connected to each of said remote units, a central office, a plurality of trunks extended between each of said remote units and said central office, switching means in each of said remote units for selectively interconnecting said trunks, said extensions and said signaling transmittal means over time division multiplex communication links, means in each of said trunks for converting ringback signals applied by said central office to signaling information, and means in said control unit for detecting said converted ringback signals on said signaling transmittal means when said trunks are interconnected with said signaling transmittal means.

5. A telephone switching system in accordance with claim 4 further including means for enabling the interconnections of said trunks and said signaling transmittal means only responsive to predetermined supervisory conditions associated with calls served by said remote units.

6. A telephone switching system for a central office comprising a control unit and a plurality of remote switching units, a plurality of extensions connected to each of said remote units, a plurality of trunks extended between each of said remote units and said central office and between respective pairs of said remote units, signaling transmittal means extended between each of said remote units and said control unit for transmitting signaling information from said remote units to said control unit, switching means in each of said remote units for selectively interconnecting said trunks, said signaling transmittal means, and said extensions, means in said control unit for detecting signaling information on said signaling transmittal means when said trunks are interconnected with said signaling transmittal means, and means in said control unit for controlling each of said remote units to connect a now on-hook extension but previously off-hook extension to the same trunk to which said extension was last connected responsive to said detecting means.

7. A private branch exchange for a telephone central office comprising a switching unit, a control unit, a plurality of extensions connected to said switching unit, a plurality of trunks extended between said switching unit and said central office, signaling transmittal means extended between said switching unit and said control unit for transmitting signaling information from said switching unit to said control unit, said switching unit including means for selectively interconnecting said trunks, said signaling transmittal means, and said extensions, means in said control unit for detecting signaling information on said signaling transmittal means orginating in said central office when said trunks are interconnected with said signaling transmittal means, and means in said control unit for controlling said switching unit to connect an extension to the same trunk to which said extension was last connected responsive to said detecting means.

8. A telephone switching system for a central office comprising a control unit and a plurality of remote switching units, each of said remote units comprising a plurality of time division multiplex communication links, a plurality of extensions, a plurality of transmission trunks extended to said central office, a plurality of signaling trunks extended to said control unit, a tone source, gating means individually associated with said extensions, said transmission trunks, said signaling trunks, and said tone source for selectively interconnecting said extensions, said transmission and signaling trunks, and said tone source through said time division multiplex communication links; means in said control unit responsive to a preselected supervisory condition associated with a call for causing the remote unit serving said call to interconnect the one transmission trunk serving said call to one of said signaling trunks through said time division multiplex communication links; and means in said control unit for detecting a predetermined signal on said one signaling trunk when said one transmission trunk is interconnected with said one signaling trunk.

9. A telephone switching system in accordance with claim 8 further including means in said control unit responsive to said detecting means for causing the remote unit to which said one transmission trunk is connected to connect said tone source to the extension previously connected to said one transmission trunk.

10. A telephone switching system in accordance with claim 8 further including means in each of said transmission trunks for converting a preselected signal from said central office into said predetermined signal.

11. A private branch exchange for a telephone central office comprising a switching unit, a control unit, a plurality of extensions connected to said switching unit, a plurality of trunks extended between said switching unit and said central office, signaling transmittal means connected between said switching unit and said control unit for transmitting signaling information from said switching unit to said control unit, means in said switching unit controlled by said control unit for establishing a talking path between one of said extensions and one of said trunks, means in said control unit responsive to said one extension going on-hook for causing said switching unit to release said talking path and to establish a connection between said one trunk and said signaling transmittal means, means for converting a ringback signal applied to said one trunk by said central office to a form recognizable by said control unit, and means in said control unit responsive to the detection of said recognizable signal on said signaling means for controlling said switching unit to re-establish said talking path.

12. A private branch exchange for a telephone central office comprising a plurality of extensions connected to said private branch exchange, a plurality of trunks extended between said private branch exchange and said central office, time division communication means for establishing a talking path through said private branch exchange between any one of said extensions and any one of said trunks, means responsive to said one extension going on-hook for releasing said talking path and for scanning said one trunk for a predetermined coded signal, means in each of said trunks for converting ringing current applied by said central office to said trunks to said predetermined coded signal, and means responsive to the detection of said predetermined coded signal on said one trunk for ringing said extension and for re-establishing said talking path.

13. In a telephone system comprising a central office, remote switching units terminating a plurality of telephone lines, a plurality of trunks connecting said switching units with said central office and a control unit common to said switching units, means for transmitting control information between said switching units and said control unit, means including said last-mentioned means for re-establishing a talking path between a calling line at one of said switching units and said central office via one of said trunks, means operative upon disconect of said calling line from said talking path for completing a connection between said central office and said control unit via said one switching unit and said one trunk, means at said central office for applying a ringing signal to said connection, means for converting said ringing signal to a distinct coded form, and means in said control unit responsive to receipt of said coded signal for re-establishing said talking path.

References Cited by the Examiner

UNITED STATES PATENTS 2,889,407 6/1959 Trousdale ---------- 179—18.9

KATHLEEN H. CLAFFY, *Primary Examiner.*

L. A. WRIGHT, *Assistant Examiner.*